May 12, 1970 C. H. BIBER 3,511,142
EXPOSURE CONTROL MEANS
Filed March 21, 1967 3 Sheets-Sheet 1
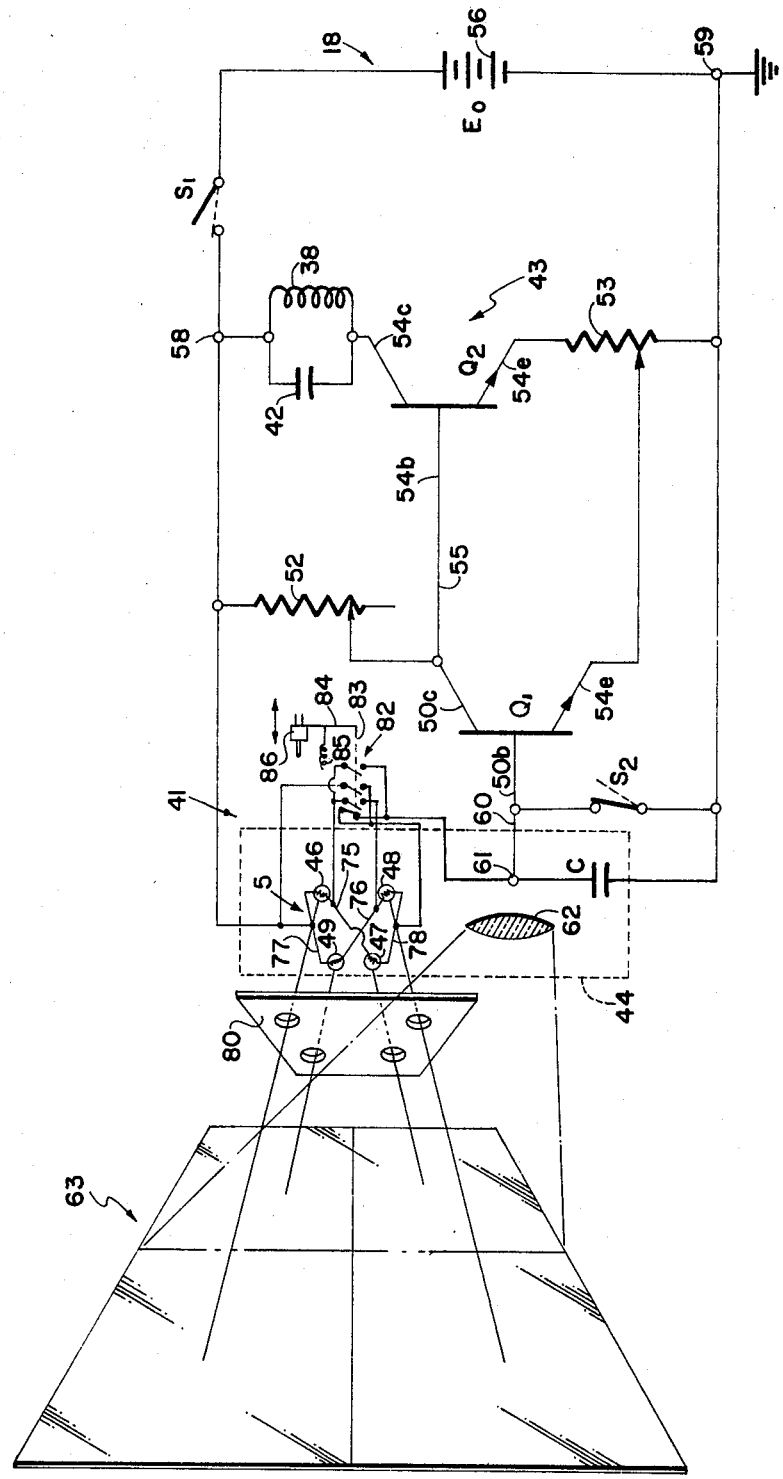
FIG. I
INVENTOR.
Conrad H. Biber
BY
Brown and Mikulka
and
Leonard S. Selman
ATTORNEYS May 12, 1970  C. H. BIBER  3,511,142
EXPOSURE CONTROL MEANS
Filed March 21, 1967  3 Sheets-Sheet 2
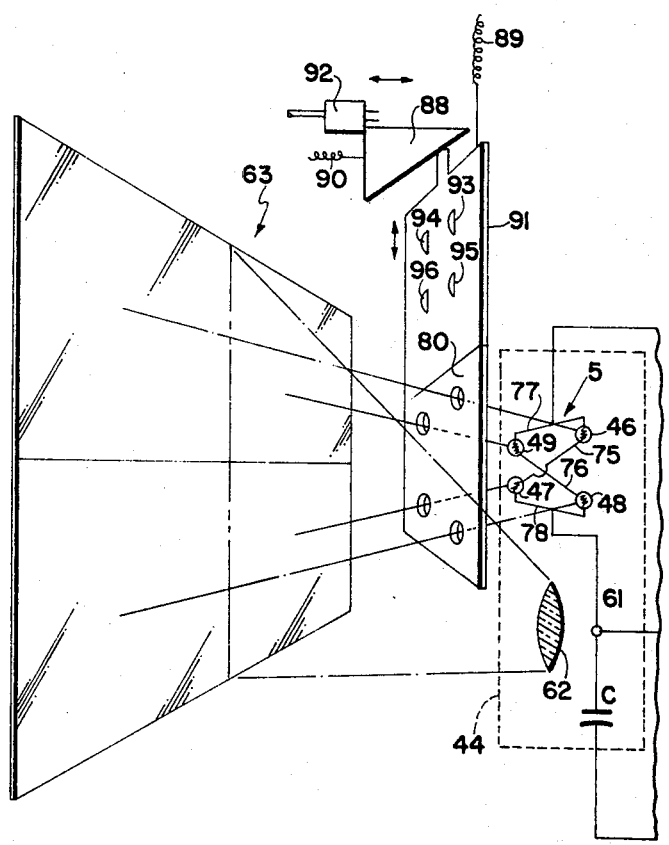
FIG. IA
INVENTOR.
Conrad H. Biber
BY Brown and Mikulka
and
Leonard S. Selman
ATTORNEYS May 12, 1970   C. H. BIBER   3,511,142
EXPOSURE CONTROL MEANS
Filed March 21, 1967   3 Sheets-Sheet 3

INVENTOR.
Conrad H. Biber
BY Brown and Mikulka
and
Leonard S. Selman
ATTORNEYS

United States Patent Office 3,511,142
Patented May 12, 1970

3,511,142
EXPOSURE CONTROL MEANS
Conrad H. Biber, Needham, Mass., assignor to Polaroid Corporation, Cambridge, Mass., a corporation of Delaware
Filed Mar. 21, 1967, Ser. No. 624,774
Int. Cl. G01j 1/52
U.S. Cl. 95—10   14 Claims

ABSTRACT OF THE DISCLOSURE

An exposure control system incorporating a light sensing circuit having four photocells each of which is oriented upon a camera to witness a discrete portion of a scene to be photographed. Under ambient scene lighting conditions, the cells are series-parallel connected to cause their combined output to be responsive to darker light levels within the scene. Converting means such as a switch bank or an assembly of lenses selectively positioned over each photocell is provided to convert the circuit to operation with flash illumination wherein the combined output of the cells is responsive to the brighter portion of the scene.

---

The invention is related to that disclosed in copending application Ser. No. 607,476, filed Jan. 5, 1967, and assigned to the same assignee. In the invention therein disclosed, an exposure control means utilizes four photosensitive elements arranged to receive light from four substantially separate portions of the scene to be photographed. The photosensitive elements are arranged to form a network incorporated in an electrical circuit such that the two elements which receive light from each pair of diagonally opposite portions of the rectangular picture area are connected in series and the two diagonal pairs of photosensitive elements are connected in parallel across the terminals of said network. The electrical circuit within which these elements are incorporated includes a source of potential and a shutter control means responsive to the combined effect of the light received by the above photosensitive arrangement such that in daylight or ambient light conditions an accurate exposure is obtained based on the brightness of all four portions of the picture area but giving greater weight to the darker portions of the scene.

SUMMARY OF THE INVENTION

It has been found that under certain lighting conditions such as those scenes lighted by a flash bulb, the above mentioned series-parallel combination of elements is less satisfactory and this application is directed to a means for converting such a photosensitive element combination to what may be referred to as a flash mode.

Specifically, the invention herein disclosed is directed to means for automatically converting exposure control means in a photographic camera including a network of photosensitive elements for receiving light from a scene being photographed from an ambient or daylight mode to a dynamic or flash mode. In scenes photographed with the use of flash bulbs there is likely to be a small brightly lit area such as a person in the foreground and a larger dark background which is relatively unimportant. In such a situation, it is desirable to expose for the smaller brightly lit areas and for this purpose it has been found that an arrangement where each of the photosensitive elements are connected in parallel rather than in a series-parallel combination across the network terminals gives improved results. Another means of achieving an improved result under flash conditions is by positioning a light directing means in front of the photosensitive elements which directs the light from the entire scene rather than only the light for a separate portion of the scene to each element individually. Due to the nature of the photosensitive elements, this arrangement will similarly result in an exposure giving greater effect to the brightly lit areas of the scene.

Accordingly, it is an object of this invention to provide improved automatic control of exposure in a photographic camera.

It is another object of this invention to provide automatic exposure control means responsive to the light from various portions of the scene to be photographed.

It is yet another object of this invention to provide an improved automatic exposure control means for photographing scenes lighted by either ambient light or by dynamic illumination such as the light from a flashbulb.

It is a further object of this invention to provide an improved exposure control means which may be automatically converted from a daylight mode to a flash mode.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

FIG. 1 is a schematic electrical diagram of the present invention including a representation of the photoresponsive elements incorporated into the camera receiving light from the scene to be photographed;

FIG. 1A is a fragmentary view schematically illustrating the light directing means of the present invention;

DESCRIPTION OF THE PREFERRED EMBODIMENT

Figure 2:
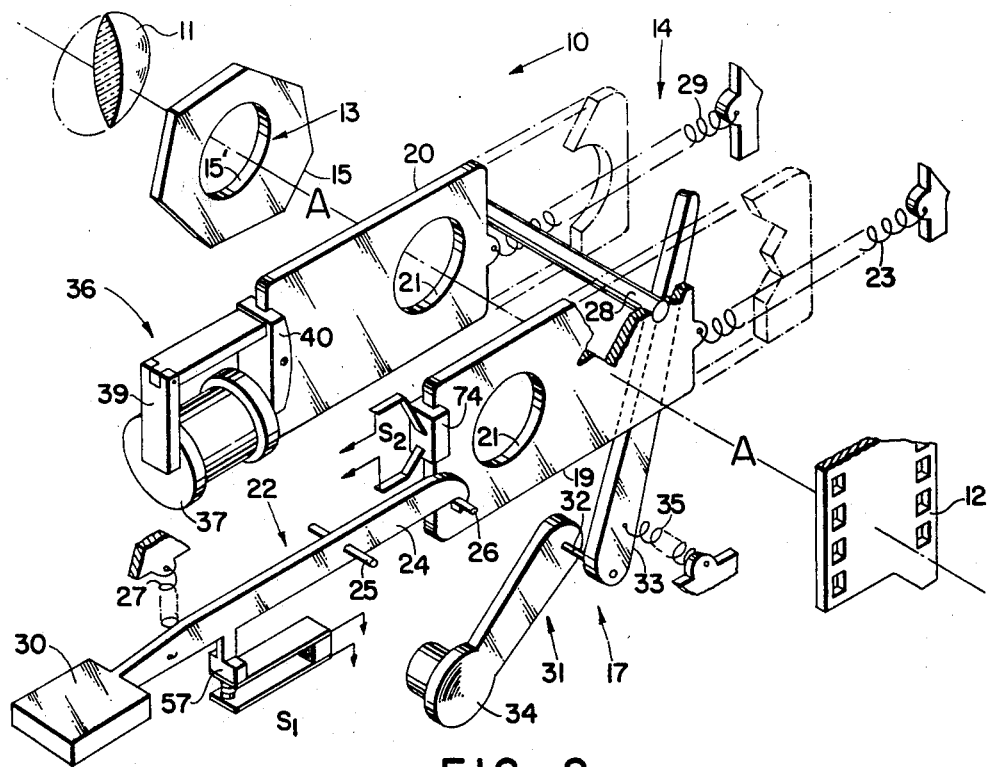
FIG. 2 is a schematic representation of a camera of a type particularly well adapted for use with the present invention.

The exposure control system which is the subject matter of the present invention may control either the exposure interval or the size of the diaphragm opening, or both, to achieve the proper exposure factor for a particular scene to be photographed.

In the preferred embodiment of the invention, the exposure is regulated by means of a shutter control means to be described. The shutter control means is shown in the drawing as embodied into a camera having a particular type of mechanical shutter but the latter is for the purpose of illustrating the invention in a representative environment it being understood that other types of shutter means could also be used with the shutter control means disclosed in order to derive the new and improved results attendant thereto.

The term "photosensitive element" as used in the specification and claims should be understood to include any photosensitive element having a conductive parameter which varies in accordance with the light incident thereon, such as photodiodes and phototransistors.

Referring to FIG. 1, the photoconductor network 5 includes four photosensitive elements schematically shown as receiving light from separate portions of the scene being photographed. Each of these elements has an electrical parameter, termed conductance, referring to the amount of electrical current that the element will conduct in an electrical circuit, which varies in accordance with the quantity of light incident thereon from its respectively associated portion of the scene. The pairs of photosensitive elements receiving light from diagonally opposite portions of the picture area are shown in the daylight mode as connected in series across the terminals of network 5. In this mode due to the nature of the photosensitive elements the one element of the series connected pair receiving light from a darker portion of the scene will be much less conductive of electric current than the photosensitive element receiving light from a brighter portion of the scene. This is true of both pairs of series-connected photosensitive elements as shown in FIG. 1 and it may also be said that the network 5 has a combined electrical parameter of conductance which is affected to a greater extent in the daylight mode by those photosensitive elements which receive light from the darker portions of the scenes rather than the brighter portions. This arrangement prevents small bright areas of the scene which may be present to have a dominating effect on the conductance of the network 5 so that an exposure may result which will bring out the detail in the darker areas of the final picture obtained.

In the flash mode, however, a different situation exists. The subjects of most interest in flash photography are generally closest to the light source and since brightness decreases inversely with a certain function with the distance (without reflector this would be the inverse square law) these subjects receive consequently the most amount of illumination. Therefore, it is desirable to provide a means whereby conductance of the network of photosensitive elements shown in FIG. 1 may be converted to a flash mode wherein the network conductance may be effected to a greater extent by those photosensitive elements receiving light from the brighter portions of the scene. This may be accomplished by providing a means to be described later which is operable to switch the series-connected pairs of photosensitive elements to an arrangement where each of said elements is connected in parallel across the terminals of network 5. Thus, the relatively higher conductance of those elements which receive light from the brighter portions of the scene will not be affected by the relatively low conductance of those elements receiving light from the darker portions. The network conductance will then be effected to a greater extent by those elements receiving the greater amount of light which will result in the most satisfactory exposure for flash photography. Another means for accomplishing the same result is shown in FIG. 1A wherein conversion to the flash mode involves the positioning of a plurality of lenses in front of the photosensitive elements which directs the light from the entire scene to be photographed to each of said elements individually instead of as in the daylight mode directing the light from separate portions of the scene being photographed to its respective element. Thus, each photosensitive element, even those connected in series with another, in the flash mode, will have its conductance effected primarily by the brighter portion rather than the darker portions which appears in the scene being photographed and the combined conductance of the network will similarly be effected primarily by said brighter portions while in said flash mode.

Referring now to FIG. 2, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area aligned with the optical axis A—A of the camera.

Shutter mechanism 14 may include shutter means 17, and shutter control means 18 as shown in FIG. 1. Shutter means 17 may take the form of a pair of planar, opaque blades 19 and 20 each provided with an exposure orifice 21, and mounted in tracks (not shown) so as to be normal to the optical axis, and reciprocable between terminal positions into intersection therewith. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be.

The blade 19 that causes exposure to be initiated is called the "opening" blade. The initial term position at which the opening blade is closed is termed the "blocking" position, while the position intermediate the two terminal positions of the opening blade at which it initiates exposure is termed the "unblocking" position. Conversely, the blade 20 that causes exposure to be terminated is called the "closing" blade. The initial terminal position at which the closing blade is open is termed the "unblocking" position, while the position intermediate the two terminal positions of the closing blade at which it terminates exposure is termed the "blocking" position.

Prior to initiation of exposure, the blades are as shown in the solid line of FIG. 2, inspection of which will indicate that releasable coupling means 22 is engaged with opening blade 19 to hold the latter in blocking position against the bias of spring means 23 which urges the blade toward unblocking position. Coupling means 22 includes lever 24 pivotally mounted on pin 25 and engaged with latch pin 26 attached to blade 19. Latch spring 27 engaged with lever 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter open position against the bias of spring means 29 urging the closing blade toward its blocking position. As can be seen from the drawing, bar 28 does not interfere with the independent movement of opening blade 19 to its open position.

Such movement takes place upon manual depression of end portion 30 of lever 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preprogramed period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preprogramed period of time, shutter control means 1 causes closing blade 20 to be released thus terminating exposure when the latter is moved from open to blocking position by the action of bias spring means 29.

When exposure is terminated, blades 19 and 20 are in the position shown by the broken lines of FIG. 2. That is to say, blade 19 is in open position and blade 20 is in blocking position, with reset bar 28 again engaged with blade 20. Having completed the exposure cycle, the blades are returned to their normal position by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure position wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuable to cause shutter means 17 to initiate exposure, and deactuatable after said preselected period of time to cause the shutter means to terminate exposure, as previously described. Specifically, operator means 36 may take the form of an electromagnet 37 which has solenoid 38, see FIG. 1, wound around one leg of U-shaped pole-piece 39, the free ends of which are coplanar and cooperable with magnetizable keeper 40 mounted on closing blade 20. When the latter is in open position, pole-piece 39 and keeper 40 define a magnetic circuit of a particular reluctance, such that a preselected magnetomotive force resulting from the solenoid current is sufficient to establish an attractive force between the pole-piece 39 and the keeper 40 that exceeds the separating force exerted on the closing blade by the biasing action of spring means 29 and is sufficient to resist dynamic loads due to the shock of the bottoming of the opening blade.

Shutter control means 18 further includes shutter timing apparatus 41, the purpose of which is to furnish an energizing current to the solenoid 38 of electromagnet 37. If the camera is to be portable and battery operated, it is important to minimize current drain on the battery. With this in mind, premature release of closing blade 20 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid 38 should be energized before opening blade 19 begins to move out of unblocking position, because this blade, through bar 28, serves initially to position keeper 40 in engagement with pole-piece 39. Once the keeper separates even slightly from the pole-piece, the reluctance of the magnetic circuit becomes so high, that the attractive force produced by the solenoid current is unable to overcome the force of spring 29 urging the closing blade to blocking position.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 42 which shunts the solenoid 38 and prevents the induced voltage from damaging transistor $Q_2$. The current in the solenoid however, rapidly decays to the point where the magnetic induction is so reduced that the force of attraction of the pole-piece on the keeper is equal to the spring force urging separation. At this point, there is in initial movement of keeper 40 as the closing blade is drawn toward unblocking position by the spring bias. The time between the instant that the current in transistor $Q_2$ is rapidly reduced and the instant that release of the closing blade is accomplished is very small in terms of the ordinary exposure interval, being only a fraction of a millisecond. For this reason, it is considered that the conduction of transistor $Q_2$ is reduced, and movement of the closing blade begins at substantially the same time. For the reasons set forth above, namely rapid switching of the current input to the solenoid and low power consumption, shutter timing apparatus 41 comprises a transistorized, two-stage, modified Schmitt-type trigger circuit 43, responsive to the output voltage from network 44, for controlling the actuation and deactuation of shutter operator means 36. The voltage sensitive trigger circuit 43 has a normally nonconducting stage that includes transistor $Q_1$ preferably of a silicon type, having base, collector and emitter electrodes 50b, 50c and 50e respectively. The collector electrode 50c of transistor $Q_1$ is connected to terminal 47 of the shutter timing apparatus by variable bias resistor 52, and emitter electrode 50e of transistor $Q_1$ is connected to terminal 48 of the shutter timing apparatus by variable bias resistor 53. The normally conducting stage of circuit 43 includes transistor $Q_2$ having base, collector and emitter electrodes 54b, 54c and 54e. Collector electrode 54c is connected to terminal 47 through solenoid 38 so that the latter is energized when $Q_2$ conducts. Base electrode 54b of transistor $Q_2$ is connected to collector electrode 50c of transistor $Q_1$ through lead 55, and emitter electrode 54e of $Q_2$ is connected through bias resistor 53 to terminal 48. It should be noted that with this arrangement there is essentially a common emitter resistor, the adjustment to resistor 53 being for the purpose of establishing the voltage at which it is desired to trigger circuit 43. While the two stages of circuit 43 have been characterized as "normally nonconducting" and "normally conducting" it should be obvious that this characterization is applicable only when a potential source is applied across terminals 58 and 59.

In order to apply potential source 56, shown in the form of a battery of potential $E_0$ connected from terminal 58 to terminal 59 through normally open switch S1, in such a way as to minimize current drain on the battery, actuator lever 24 (see FIG. 2) is provided with switch operating arm 57 that is engageable with one of the contacts of switch S1. When the lever is manually depressed to disengage coupling means 22 from opening blade 19, the contacts of switch S1 are closed.

Figure 3:
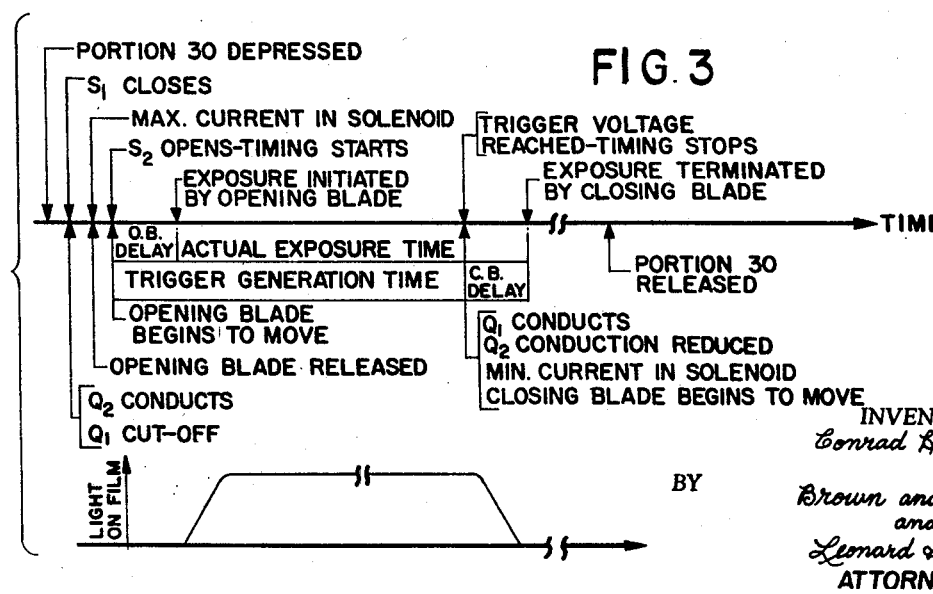
FIG. 3 is an expanded time-scale diagram for the purpose of illustrating the chronology of events associated with effecting exposure utilizing the camera of FIG. 2 and the electrical system of FIG. 1.

The sequence of events that occur as a result of the depression of end portion 30 will now be explained by making reference to the expanded time-scale diagram shown in FIG. 3. The initial depression of portion 30 closes the contacts of S1 before the rotation imparted to lever 24 effects its disengagement from pin 26. Since human reaction time involved in depressing lever 24, namely the time to depress the lever and release it, and the inertial delay of the lever in returning to its normal position, substantially exceeds the longest average exposure apt to be used under normal conditions of scene brightness, the contacts of switch S1 are closed for at least as long as the correct exposure time.

Inspection of transistor $Q_2$ stage of circuit 43 indicates that base electrode 54b, as shown in FIG. 2, is the input to this stage, collector electrode 54c is the output, and emitter electrode 54e is common to the input and output. Resistor 52 coupled between input electrode 54b and terminal 58 acts as a fixed base resistor for providing, when S1 is closed, a fixed base current bias that causes transistor $Q_2$ to conduct instantaneously with the closing of S1. The setting of variable resistor 52 establishes the degree to which transistor $Q_2$ conducts so that the current through solenoid 38 can be adjusted to provide the proper magnetomotive force in the magnetic circuit of electromagnet 37 for preventing accidental release of closing blade 20 when the opening blade moves to unblocking position to initiate exposure. The flow of current through resistors 52 and 53, when transistor $Q_2$ conducts, establishes at the collector and emitter electrodes of $Q_1$, bias voltages having first values dependent upon the magnitudes of the respective currents and resistance values.

Until the initial displacement of the opening blade out of its blocking position, conductive block 74 on the opening blade engages the contacts of S2 whereby the latter is closed. Connection 49 is at an initial value of voltage, namely ground potential, at the instant S1 is closed. When the voltage at connection 61 is at its initial value, and the voltages at the collector and emitter electrodes of transistor $Q_1$ are at their first values of bias voltage due to the conduction of $Q_2$, the collector-base and emitter-base junctions of transistor $Q_1$ are reverse biased, thus resulting in transistor $Q_1$ being cut off. For this reason, it may be said that the bias of transistor $Q_1$ is primarily established by the voltage at terminal 61.

Meanwhile, the current through the solenoid builds rapidly to its maximum value causing the maximum retaining force to be exerted on the closing blade shortly after S1 is closed and just prior to the total disengagement of lever 24 from pin 26 which releases the opening blade for movement out of blocking position. The initial movement of the opening blade causes conductive block 74 to disengage the contacts of S2 thereby opening the same to apply the voltage source across timing network 44 and activate the same. Network 44 includes capacitor means C in series with a smaller network 5 of four individual photoconductive elements 46, 47, 48 and 49 such as cadmium sulfide photocells or the like and connected together in a manner which will be described in detail later in the specification. Network 44 is connected between terminals 58, 48 of the shutter timing apparatus so as to form a conventional integrator circuit whose input terminal is at 58, and whose output terminal is at 61, the connection between the capacitor means and the photoconductive element. Terminal 61 is connected by fixed impedance 60 to base electrode 50b of transistor $Q_1$, the latter electrode constituting the input electrode of that stage.

The opening of S2 activates network 44, which is to say that the latter is caused to generate, at connection 49, a voltage having an initial value (in this case ground potential) which causes transistor $Q_1$ to be reverse biased to cut-off, and then changes with time reaching a preselected value, termed the trigger voltage, which forward biases transistor $Q_1$, in a period of time termed the trigger generation time.

When the voltage at connection 61 reaches the trigger voltage, it causes the emitter-base junction of transistor $Q_1$ to be forward biased. Now, element 45 functions like a base resistor whose value is dependent upon the level of scene brightness and provides base current bias that cause transistor $Q_1$ to conduct producing collector current at the output electrode thereof which flows through resistor 52 increasing the voltage drop thereacross and lowering the voltage at the input electrode of $Q_2$. This reduces the forward bias on $Q_2$ thus decreasing the flow of current through the latter and causing a reduction in the voltage drop across bias resistor 53 thereby increasing the forward bias on transistor $Q_1$ even more. This regenerative feedback between the stages of voltage sensitive trigger circuit 43 will cause conduction to switch rapidly from transistor $Q_2$ to transistor $Q_1$, if sufficient collector current is available in transistor $Q_1$. Assuming this is true, the different flows of current through bias resistors 52 and 53 after switching takes place, establish second values of bias voltages at electrodes 50c and 50e of transistor $Q_1$ such that the conduction of transistor $Q_2$ is severely and rapidly reduced thereby rapidly deenergizing solenoid 38 to effect a sharp release of the closing blade. When the closing blade is released, it begins to move out of unblocking position, and will terminate exposure at its blacking position as explained previously. Thus, the shutter means terminates exposure in response to deactuation of the shutter operator means.

As described above network 44 includes capacitor means C in series with a smaller network of four individual photosensitive elements 45, 46, 47 and 48 such as cadmium sulfide photocells or the like the cells being arranged to receive light in the daylight mode from four substantially separate portions of the scene to be photographed as illustrated in FIG. 1. The camera lens 62 is shown schematically as receiving light from the entire scene 63. The photocells may be arranged in a rectangle and in the daylight mode the conductive means 75 and 76 provide series connections between the pairs of diagonally located photocells and conductive means 77 and 78 provide parallel connections between both diagonal pairs. Element 80 is schematically shown as directing the light from the various portions of the scene being photographed to the individual photocells. In practice, a lens may be used in combination with a mask such as element 80 to direct the light to the individual photocells, or a lens of short focal length may be used to image the scene on the photocells which are positioned in such a manner as to receive the light from substantially separate portions of the scene.

As the photocells have a conductance directly related to the level of scene brightness the photocells exposed to the brighter portions of the scene will have the highest conductance and would tend to shorten the exposure interval in the circuit disclosed in FIG. 1. However, if the diagonally positioned photocell with which it is connected in series in the daylight mode is receiving less light from the diagonally opposite portion, as for example in the case of a dark foreground, due to the nature of the cell it will have a very much lower conductance and the two conductances in series will automatically provide a reading which gives greater effect to the darker areas of the scene than the brighter areas in controlling the exposure interval.

Different conditions exist, however, when taking pictures by the light of a flashbulb and it is the purpose of this invention to provide a means for converting the network of photocells to a flash mode wherein the small brightly lit areas of primary interest have a greater influence in determining the exposure factor than the darker portions of the scenes.

The particular means to convert network 5 to the flash mode are shown schematically in FIG. 1 and 1A. FIG. 1 shows a series of switches 82 which when closed result in converting said network to a condition wherein each of the photocells 46, 47, 48 and 49 are connected in parallel across the network terminals instead of in series-connected pairs. Bar 83 connects said switches for common actuation and element 84 and spring 85 coact with flash-plug 86 to provide the automatic switching action upon insertion and removal of the flashplug.

In FIG. 1A an alternate means is shown for converting network 5 to the flash mode. In this form of the invention, element 88 and springs 89 and 90 provide a means for selectively positioning element 91 instead of element 80 in front of the photocells upon insertion of the flashplug 92. The lenses 93, 94, 95 and 96 carried by element 91 direct the light from the entire scene 63 being photographed to each cell individually. Thus, the network 5 is automatically shifted between the daylight and the flash mode by insertion and removal of the flash gun plug in its socket. As explained previously, this arrangement has the advantage that in both natural light and flash photography, the exposure is automatically controlled to give emphasis to the subject matter of primary interest.

As referred to previously, photodiodes may be utilized as the photosensitive elements in the exposure control circuit. For example, a silicone photodiode may have segmental areas, responsive to light from separate portions of the scene being photographed, etched on the surface of the chip thereof and connected in the aforesaid diagonal sensing series-parallel type network. The photodiode may have a small lens built onto the front thereof to direct the light to the light sensitive surface and a slide carrying a specular filter and a diffusor may be positioned in front of the lens. The specular filter, which may be of the neutral density type, is used in the daylight mode and allows the lens to focus substantially separate portions of the scene on the aforesaid segmental areas of the photosensitive surface. To convert to the flash mode the diffusor may be positioned in front of the lens, responsive to insertion of the flash plug, resulting in the light from the entire scene striking each segment equally. The segmental surfaces of the photodiode and their electrical connections form a network which will have a combined electrical parameter (conductance) which is effected to a greater extent in the daylight mode by the segment or segments which receive light from the darker portions of the scene rather than the brighter portions but in the flash mode said combined electrical parameter will be effected to a greater extent by the segment or segments which receive light from the brighter portions of the scene rather than the darker portions.

Since certain changes may be made in the above device without departing from the scope of the invention herein involved, it is intended that all matter contained in the above description or shown in the accompanying drawing shall be interpreted as illustrative and not in the limiting sense.

What is claimed is:

1. An exposure control system for photographic apparatus responsive in one operational mode to ambient scene illumination and, in another operational mode, to transient or flash scene illumination comprising:

exposure control means for regulating the amount of light admitted through a photographic aperture during an image forming exposure;

a light sensitive circuit including at least two photosensitive elements oriented to receive light from different discrete portions of a scene to be photographed, each said element having an electrical parameter variable in accordance with a level of light incident thereon, said elements being interconnected for providing an output signal representative of a select combination of said parameters;

converting means for selectively adjusting said light sensitive circuit to provide an output signal responsive to the light level of the darker of said scene portions when operating in said ambient mode and for adjusting said circuit to provide an output signal responsive to a greater extent to the light level of the brighter of said scene portions when operating in said transient mode; and control circuit means responsive to said output for regulating said exposure control means.

2. The invention of claim 1 wherein said converting means comprises a light directing means for directing light from substantially separate portions of the scene to each photosensitive element in said ambient mode and for directing light from the entire scene to each photosensitive element individually in said transient mode.

3. The invention of claim 2 wherein a plurality of lenses, one for each photosensitive element, is provided to direct the light from the entire scene to each photosensitive element individually in said transient mode.

4. The invention of claim 1 wherein said exposure control means comprises:

shutter means for controlling the time interval that said scene illumination is allowed to pass through said aperture.

5. The invention of claim 1 wherein said exposure control means comprises:

shutter means for controlling the time interval that said scene illumination is allowed to pass through said aperture; and shutter operator means constructed and arranged so that the shutter means is caused to initiate exposure in response to actuation of said shutter operator means and caused to terminate exposure only when said shutter operator means is deactuated.

6. The invention of claim 1 wherein the exposure control means includes:

shutter means for controlling the time interval that the light from the scene is allowed to pass to the film plane of the camera;

diaphragm means for effecting the size of the aperture through which the light from the scene is allowed to pass to the film plane; and means for regulating at least one of said shutter or diaphragm means to provide the proper exposure factor for the scene to be photographed.

7. The invention of claim 1 wherein said exposure control means includes:

a shutter means for controlling exposure; and shutter operator means constructed and arranged so that said shutter means is caused to initiate exposure in response to actuation of said shutter operator means and caused to terminate exposure only when said shutter operator means is deactuated; and said control circuit means includes:

a voltage sensitive trigger circuit, including a transistor stage having an input, for actuating and deactuating said shutter operator means;

means for causing said voltage sensitive trigger circuit to actuate said shutter operator means;

an electric network including capacitor means coupled to said plurality of photosensitive elements which are exposed to light from a scene to be photographed, said elements having a conductance directly related to the level of scene brightness;

means coupling the capcitor means of said network to said input;

said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time; and means to activate said network substantially at the same time said voltage sensitive trigger circuit actuates said shutter operator means.

8. A camera having exposure control means for photographing scenes lighted by either ambient light or by dynamic illumination such as a flashbulb, comprising:

a plurality of photosensitive elements responsive to the light from different discrete portions of said scene, said photosensitive elements being incorporated in an electrical circuit including a source of potential;

means for connecting at least a pair of said photosensitive elements in series in said electrical circuit when photographing said scenes in said ambient light;

means for changing said series connections between said photosensitive elements to parallel connections when photographing scenes lighted by light from a flashbulb; and means responsive to the electrical current flow through the combination of photosensitive elements for regulating said exposure control means to provide a proper exposure factor for the scene to be photographed.

9. The exposure control system of claim 1 wherein said photocells are series connected to provide said select parameter combination.

10. The exposure control system of claim 9 wherein said converting means includes:

means for coupling said photocells to form at least one series connected pair when operating in said ambient mode; and means for coupling all said photocells in parallel when operating in said transient mode.

11. The exposure control system of claim 1 in which said light sensitive circuit includes at least four said photosensitive elements interconnected as series connected pairs, said pairs being connected in parallel with each other to form a series-parallel network of said elements.

12. The exposure control system of claim 11 in which said converting means comprises switching means for converting said series-parallel connected photosensitive elements into parallel connected photosensitive elements when operating in said transient mode.

13. A camera having exposure control means for photographing scenes lighted by either ambient light or by dynamic illumination such as a flashbulb, comprising:
   a plurality of photosensitive elements responsive to the light from various portions of the picture area, said photosensitive elements being incorporated in an electrical circuit including a source of potential;
   means for connecting at least four of said photosensitive elements in at least two series connected pairs in said electrical circuit and means connecting at least one of said series connected pairs of photosensitive elements in parallel with at least another pair of series connected photosensitive elements in said electrical circuit;
   means for automatically changing the series connections between said photosensitive elements for photographing scenes lighted by ambient light to parallel connections for photographing scenes lighted by a flashbulb, and;
   means responsive to the electrical current flow through the combination of photosensitive elements for regulating the exposure control means to provide the proper exposure factor for the scene to be photographed.

14. A camera having exposure control means for photographing scenes lighted by either ambient light or by dynamic illumination such as a flashbulb, comprising:
   a plurality of photosensitive elements responsive to the light from various portions of a said scene, said photosensitive elements being incorporated in an electrical circuit including a source of potential;
   means for connecting at least four of said photosensitive elements in at least two series connected pairs in said electrical circuit and means connecting at least one of said series connected pairs of photosensitive elements in parallel with at least another pair of series connected photosensitive elements in said electrical circuit;
   light directing means having a first orientation for directing light from substantially separate portions of said scene to each said photosensitive element respectively, and having a second orientation for directing light from the entirety of said scene to each photosensitive element individually; and
   means for operating said light directing means in said first orientation when photographing said scenes lighted by ambient light, and for operating said light directing means in said second orientation when photographing scenes lighted by said dynamic illumination.

References Cited

UNITED STATES PATENTS 2,183,217  12/1939  Goldsmith.
3,286,097  11/1966  Norwood _____ 250—209

JOHN M. HORAN, Primary Examiner